United States Patent
Grayson et al.

(10) Patent No.: US 8,855,082 B2
(45) Date of Patent: Oct. 7, 2014

(54) APPLICATION LOAD BALANCING FOR DIFFERENT DOMAINS

(75) Inventors: Mark Grayson, Maidenhead (GB); Steven R. Donovan, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/744,393

(22) Filed: May 4, 2007

(65) Prior Publication Data

US 2008/0275943 A1    Nov. 6, 2008

(51) Int. Cl.
*H04W 4/00* (2009.01)
*H04L 29/08* (2006.01)

(52) U.S. Cl.
CPC ........ *H04L 67/1027* (2013.01); *H04L 67/1014* (2013.01); *H04L 67/1002* (2013.01)
USPC ........... 370/331; 370/328; 370/411; 370/466; 455/435.1; 709/230

(58) Field of Classification Search
USPC ............ 709/223–226; 455/432.1–432.3, 453
See application file for complete search history.

(56) References Cited

U.S. PATENT DOCUMENTS

| | | | |
|---|---|---|---|
| 6,529,524 B1 * | 3/2003 | Liao et al. ...................... | 370/467 |
| 2001/0029182 A1 * | 10/2001 | McCann et al. ............... | 455/433 |
| 2003/0056002 A1 * | 3/2003 | Trethewey .................... | 709/238 |
| 2003/0084165 A1 * | 5/2003 | Kjellberg et al. ............. | 709/227 |

FOREIGN PATENT DOCUMENTS

WO    WO 2006085295 A1 *  8/2006

OTHER PUBLICATIONS

"Load Balancer Proxy Readme" Software release No. 1.0.0, release date May 30, 2002; Readme release version: 1.0.0, release date Jul. 17, 2002; 7 pages; obtained from http://www.vovida.org/.
"Architecture for IWLAN Mobility"; 3GPP TSG SA WG2 Architecture—S2#56c Rel-8 Ad-hoc, Azaire Networks; 6 pages; Mar. 26-30, 2007 Warsaw, Poland.
Haverinen, Ed, et al., "Extensible Authentication Protocol Method for Global System for Mobile Communications (GSM) Subscriber Identity Modules (EAP-SIM)," Network Working Group RFC4186, Jan. 2006, 93 pages.

* cited by examiner

*Primary Examiner* — Jackie Zuniga Abad
(74) *Attorney, Agent, or Firm* — Patent Capital Group

(57) ABSTRACT

In one embodiment, a method includes receiving a message associated with a device in a first domain. An identifier is determined for the device. The message is then sent to a load balancer where the message includes the identifier. The load balancer is then configured to send the message to a network device in a plurality of network devices. The network device is configured to process messages from the device. A second message may be received at the load balancer from a second domain. The second message may include the identifier for the device. The load balancer may then send the second message to the selected network device such that the first message and the second message are processed by the same network device.

19 Claims, 7 Drawing Sheets

APPLICATION LOAD BALANCING FOR DIFFERENT DOMAINS

TECHNICAL FIELD

Particular embodiments generally relate to networking.

BACKGROUND

Devices can communicate in different domains. For example, some devices may communicate through a voice channel using time division multiplex (TDM) and also may communicate through a data channel using an Internet Protocol Multimedia Subsystem (IMS). The different domains may use different infrastructures and protocols. For example, in the voice domain, mobile application part (MAP) or CAMEL application part (CAP) infrastructures may be used by network elements to send messages associated with a device using global system for mobile communications (GSM). The messages may be converted into another protocol, such as session initiation protocol (SIP) and sent to an application server. Also, the device may send messages in the data domain using SIP. The messages from different domains are sent in different sessions. In some cases, the device is identified differently in the different domains. For example, the IP address may be used to identify the device in the data domain and an International Mobile Subscriber Identity (IMSI) may be used in the voice domain.

Some service providers may want to provide load balancing to distribute load across different application servers. However, when a user is using a device in different domains, the load balancer may send messages received for the same device in different domains to different servers. This is because the device may be identified differently in the different domains and does not know that the messages are from the same device. Accordingly, a load balancer does not send the messages to the same server for processing. This may be inefficient and does not allow a service provider to apply services across different domains.

DESCRIPTION OF EXAMPLE EMBODIMENTS

Overview

In one embodiment, a method includes receiving a message associated with a device in a first domain. An identifier is determined for the device. The message is then sent to a load balancer where the message includes the identifier. The load balancer is then configured to send the message to a network device in a plurality of network devices. The network device is configured to process messages from the device. A second message may be received at the load balancer from a second domain. The second message may include the identifier for the device. The load balancer may then send the second message to the selected network device such that the first message and the second message are processed by the same network device. Thus, a load balancer may be able to determine a network device that can process messages for a device even though they are sent through different domains. Network devices in different domains are used to insert the identifier in the messages sent to the load balancer such that the load balancer can identify the device.

Example Embodiments

Figure 1:
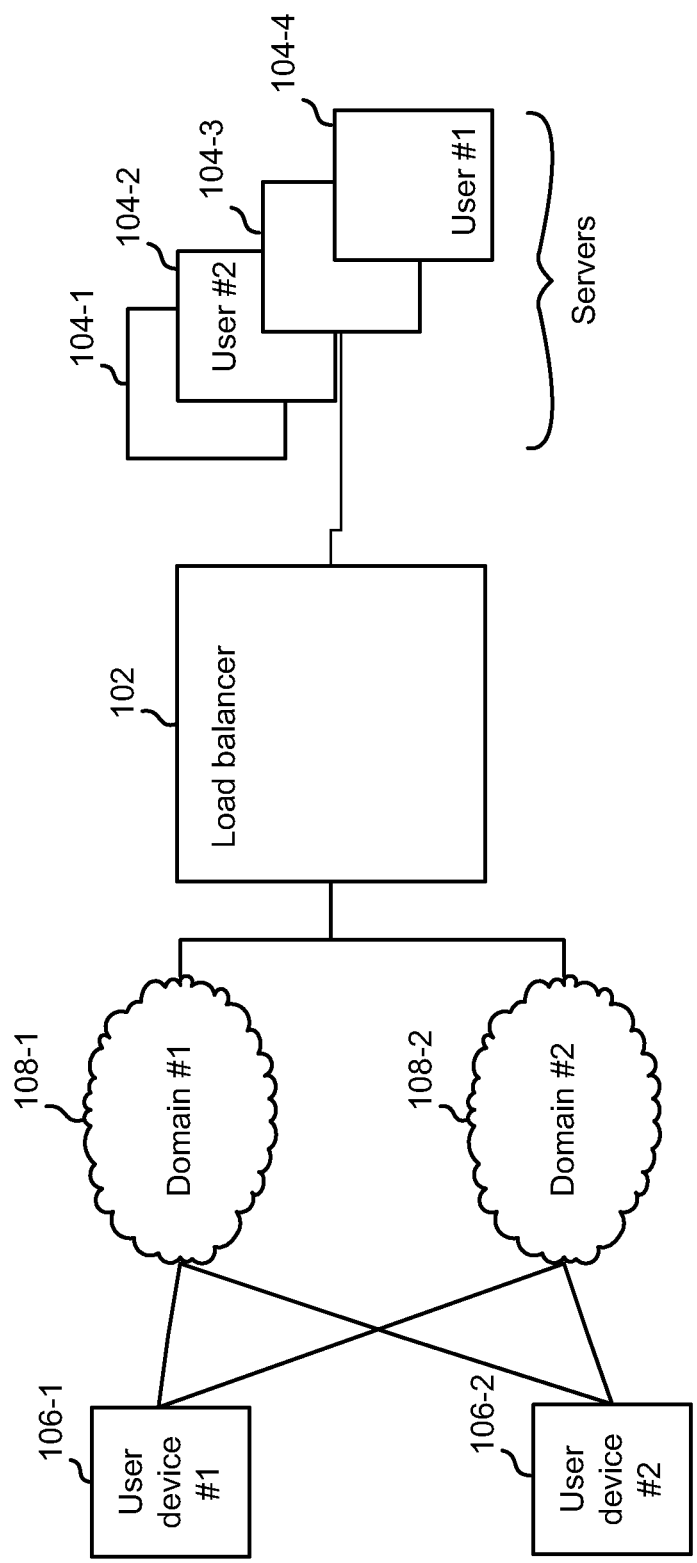
FIG. 1 depicts a simplified system for providing load balancing across different domains.

FIG. 1 depicts a simplified system for providing load balancing across different domains. As shown, a load balancer 102, a plurality of servers 104, a plurality of user devices 106, and a plurality of domains 108 are provided. It will be understood that other network components may be provided in the system but are not shown.

Load balancer 102 may be any network device configured to provide load balancing for user devices 106. For example, load balancer 102 may be a session initiation protocol (SIP) server configured to provide load balancing using the SIP protocol. Although the SIP protocol will be described, it will be understood that other protocols may be used.

Servers 104 may be any network devices configured to process messages from user devices 106. For example, servers 104 may process messages in the control plane to allow a user to register on a network and may provide configuring of a bearer plane. Also, servers 104 may be application servers running third party applications.

User devices 106 may be any devices that send messages. For example, user devices may include voice over IP (VoIP) telephones, cellular phones, laptop computers, personal computers, set top boxes, public switch telephone network (PSTN) telephones, etc. In one embodiment, user devices 106 are configured to communicate through multiple domains 108. For example, different domains may be provided in which different messages may be sent using different protocols and infrastructures. For example, domain 108-1 may use a mobile application part (MAP) or CAMEL application part (CAP) infrastructure. Domain 108-1 may provide legacy voice services. For example, services may provide short message system (SMS) and legacy voice services. Domain 108-2 may communicate through a different protocol than domain 108-1. For example, domain 108-2 may use SIP to send SIP messages. In one embodiment, domain 108-2 includes an IP multimedia subsystem (IMS). Other domains may also be appreciated.

In another embodiment, first domain 108-1 may be IPSec generated by user device 106 and second domain 108-2 may be a GPRS tunneling protocol (GTP) generated by a serving GPRS support node (SGSN). The universal identifier may be included in a message sent to load balancer 102.

When messages are received from user devices 106 through different domains 108, load balancer 102 is configured to send them to a server 104 that is processing requests for that user device. For example, if server 104-4 is processing requests for user device 106-1, whether or not the messages are received from domain 108-1 or domain 108-2, load balancer 102 sends them to server 104-4. Similarly, messages received from user device 106-2 are sent to server 104-2. Conventionally, messages sent through different domains may not be identified similarly. For example, conventionally, a user device is identified in a VoIP domain using the IP address; however, in a MAP/CAP domain, user device 106 is identified by the session ID. Thus, load balancer 106 could not determine which messages were from the same device when received from different domains 108. Accordingly, load balancer 102 to not have sent them to the same server 104 causing different servers 104 would conventionally process requests from user devices 106 received from different domains. However, particular embodiments provide a universal identifier that allows load balancer 102 to identify that the requests received from different domains 108 are from the same user device 106. Then, load balancer 102 can send the messages to a server 104 that is processing messages for user device 106.

In one embodiment, network devices in domains 108-1 and 108-2 are configured to insert the universal identifier into messages sent to load balancer 102. This is different from having user device 106 insert a universal identifier in a message sent from it. The network devices in domains 108 are configured to determine the appropriate universal identifier for the message, insert it into the message, and send the message to load balancer 102. Load balancer 102 can then load balance (i.e., send) the message to the appropriate server 104.

Figure 2:
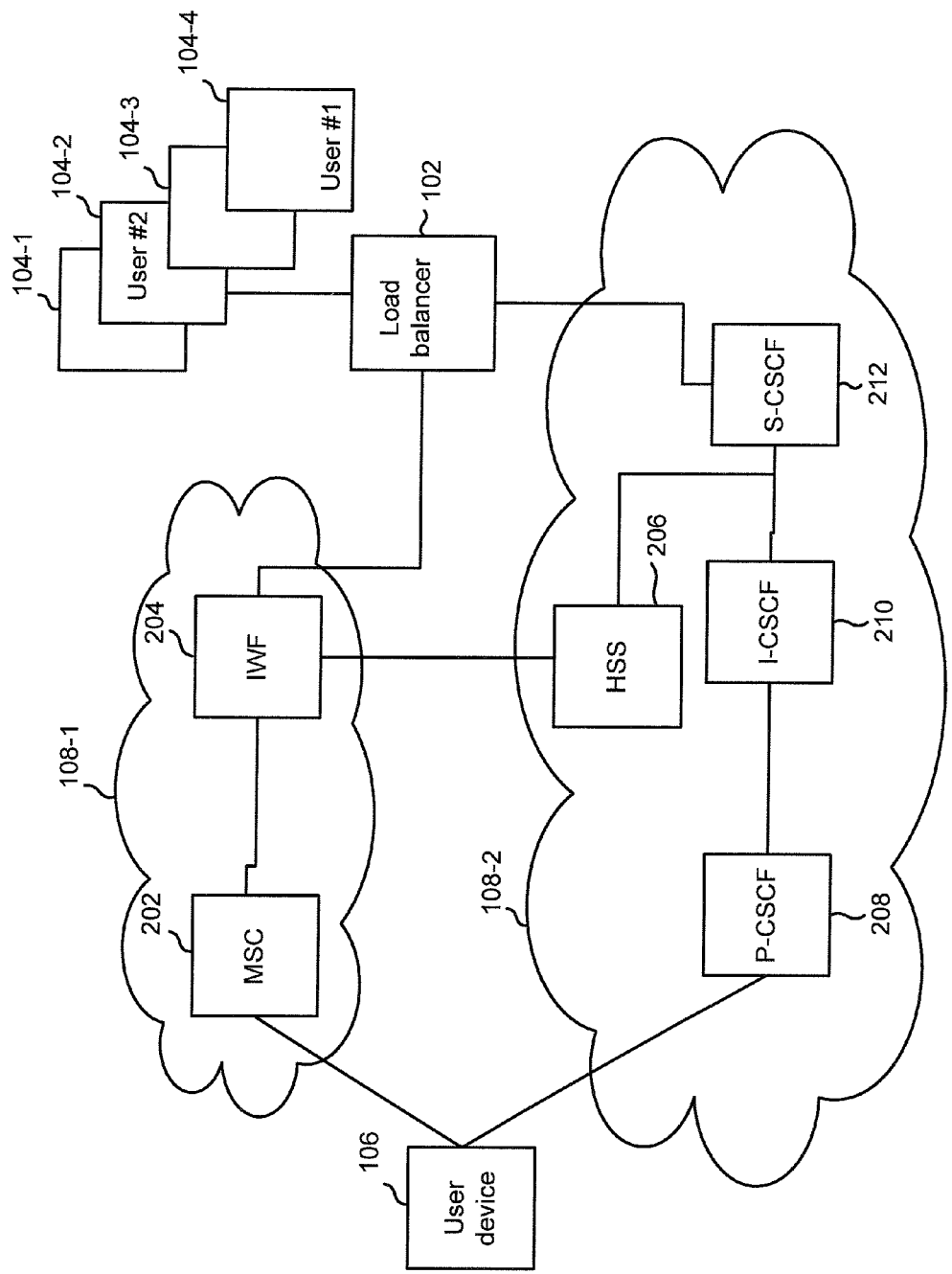
FIG. 2 depicts a more detailed example of the system.

FIG. 2 depicts a more detailed example of system 100. Domain 108-2 includes components of an IMS system and includes a proxy call session control function (P-CSCF) 208, an interrogating-CSCF (I-CSCF) 210, a serving-CSCF (S-CSCF) 212, and a home subscriber server (HSS) 206. Also, domain 108-1 may include a mobile switching center (MSC) 202 and an interworking function (IWF) 204.

P-CSCF 208 is a SIP proxy that is the first point of contact for user device 106. I-CSCF 210 is another SIP function located at the edge of an administrative domain. Its IP address is published in the DNS of the domain, so that remote servers can find it, and use it as a forwarding point (e.g. registering) for SIP packets to this domain.

In one embodiment, S-CSCF 212 and interworking function 204 are configured to receive messages from user device 106. S-CSCF 212 and interworking function 204 are configured to determine a universal identifier for devices 106. A process will now be described in which a universal identifier may be determined by these devices.

In domain 108-2, user device 106-1 may register with the IMS network. In one embodiment, the user request is sent through P-CSCF 208, I-CSCF 210 to S-CSCF 212. S-CSCF 212 may authenticate the user and sends a 401 Authorization message back to user device 106. User device 106 then sends an authentication response back to S-CSCF 212. This confirms the authentication. The authentication may authenticate that user device 106-1 can access the IMS network.

S-CSCF 212 can then communicate with HSS 206 to recover a profile for user device 106. In one embodiment, the universal identifier is defined in HSS 206 in a profile for the user. The universal identifier can be included as an attribute in a message sent to S-CSCF 212. In one embodiment, the universal identifier may be an international mobile subscriber identity (IMSI). Even though an IMSI is described, it will be understood that other universal identifiers may be used, such as secure keys, or any other unique identifier that may be provided to user device 106.

In one embodiment, S-CSCF 212 performs a third party register for the user on a designated IMS application. Transparent data encoded as extensible markup language (XML) can be defined and is passed from HSS 206 to S-CSCF 212 in an attribute of a message. Accordingly, the IMSI may then be passed to S-CSCF 212 during the registration.

After registration, S-CSCF 212 may send a registration request to load balancer 102. The registration request includes the universal identifier. Load balancer 102 may then bind the user to an application that has been requested. For example, a SIP application may be bound to the user in a server 104. In one embodiment, the IMSI may be embedded in a private (P) header that is included in a SIP REGISTER message. Load balancer 102 is configured to receive the SIP REGISTER message and determine the IMSI from the P header. Load balancer 102 may then keep track of which universal identifier is associated with which server 104.

Referring now to domain 108-1, user device 106 may send a message through domain 108-1. For example, the message may be an SMS message but may be other messages. For example, the message may be a setup message triggering the initiation of an originated voice call. MSC 202 receives a message and sends a message to interworking function 204. MSC 202 may be configured to implement Intelligent Networking functionality and operable to suspend call processing and send a CAP message towards interworking function 204. Interworking function 204 is configured to interwork messages from domain 108-1 into the SIP domain (i.e., the protocol used by domain 108-2). Although SIP is described, it will be understood that interworking 204 may interwork the message into different protocols and also interworking may not be necessary in some embodiments.

Interworking function 204 is configured to determine the universal identifier for user device 106. The universal identifier may be determined in different ways. In one example, interworking function 204 may inspect the message received from user device 106 to determine if it includes an IMSI. If it does, the IMSI may be embedded in a P-header in a SIP message that is interworked from the message received from user device 106. If the IMSI is not included in the message, then interworking function 204 may communicate with HSS 206 to determine the IMSI. In one embodiment, the Sh interface is leveraged to communicate with HSS 206. An identifier for user device may be determined, such as an MSISDN (e.g., telephone number) and that is used to identify the IMSI for user device 106 at HSS 206. HSS 206 may then send the IMSI back to interworking function 204, which can then include the IMSI in a SIP message that is sent to load balancer 102. Load balancer 102 receives the SIP message from interworking function 204 and can determine the IMSI from it. If a server 104 has been bound to user device 106 previously, then load balancer 102 uses the IMSI to determine which server 104 to send the message to. In this case, the server in which the user device 106 was previously bound to user device 106 through domain 108-2 is sent the message.

Accordingly, load balancer 102 can load balance messages received from different domains 108 to the same server 104. In one example, a timer may be used to determine how long a registration is valid for. For example, once a third party registration expires, then further messages received from user device 106 may be load balanced to different servers 104. This ensures that sessions that expire do not always cause messages from user device 106 to be sent to the server bound to the expired session. It will be understood that network devices in domain 108-1 and 108-2 may re-initiate or end the load balancing to a server 104 if desired.

Figure 3:
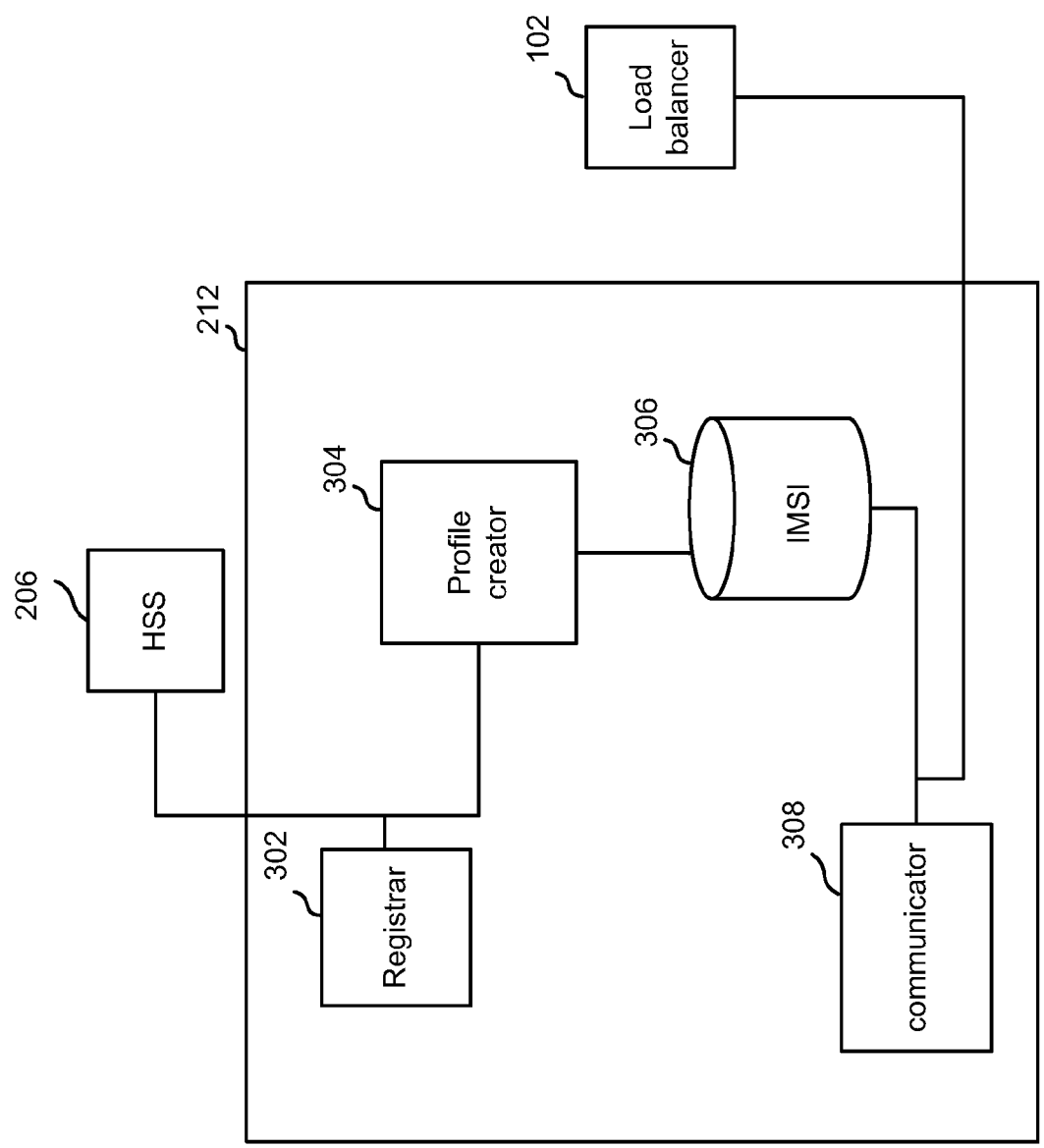
FIG. 3 depicts a more detailed embodiment of S-CSCF.

FIG. 3 depicts a more detailed embodiment of S-CSCF 212. S-CSCF 212 includes a registrar 302, a profile creator 304, storage 306, and a communicator 308. Registrar 302 is configured to receive a registration request from user device 106. It can then communicate with HSS 206 to determine a profile for user device 106.

Profile creator 304 then determines an IMSI from the registration message received from HSS 206. For example, an attribute may be inspected to determine the IMSI for user device 106. Profile creator 304 may then store the IMSI in storage 306 and associate it with user device 106.

Communicator 308 then may perform a third-party registration with load balancer 102. In this case, the IMSI may be embedded in a SIP message sent to load balancer 102 and is used by load balancer 102 to bind user device 106 to a SIP application on a server 104.

Communicator 308 is then configured to process messages from user device 106. For example, the messages may be control messages that are used to set up a bearer path for user device 106. When messages are received from user device 106, the IMSI may be retrieved from storage 306 and included in messages sent to load balancer 102. Thus, the messages may be sent to the same server 104 that is handling the session for user device 106.

Figure 4:
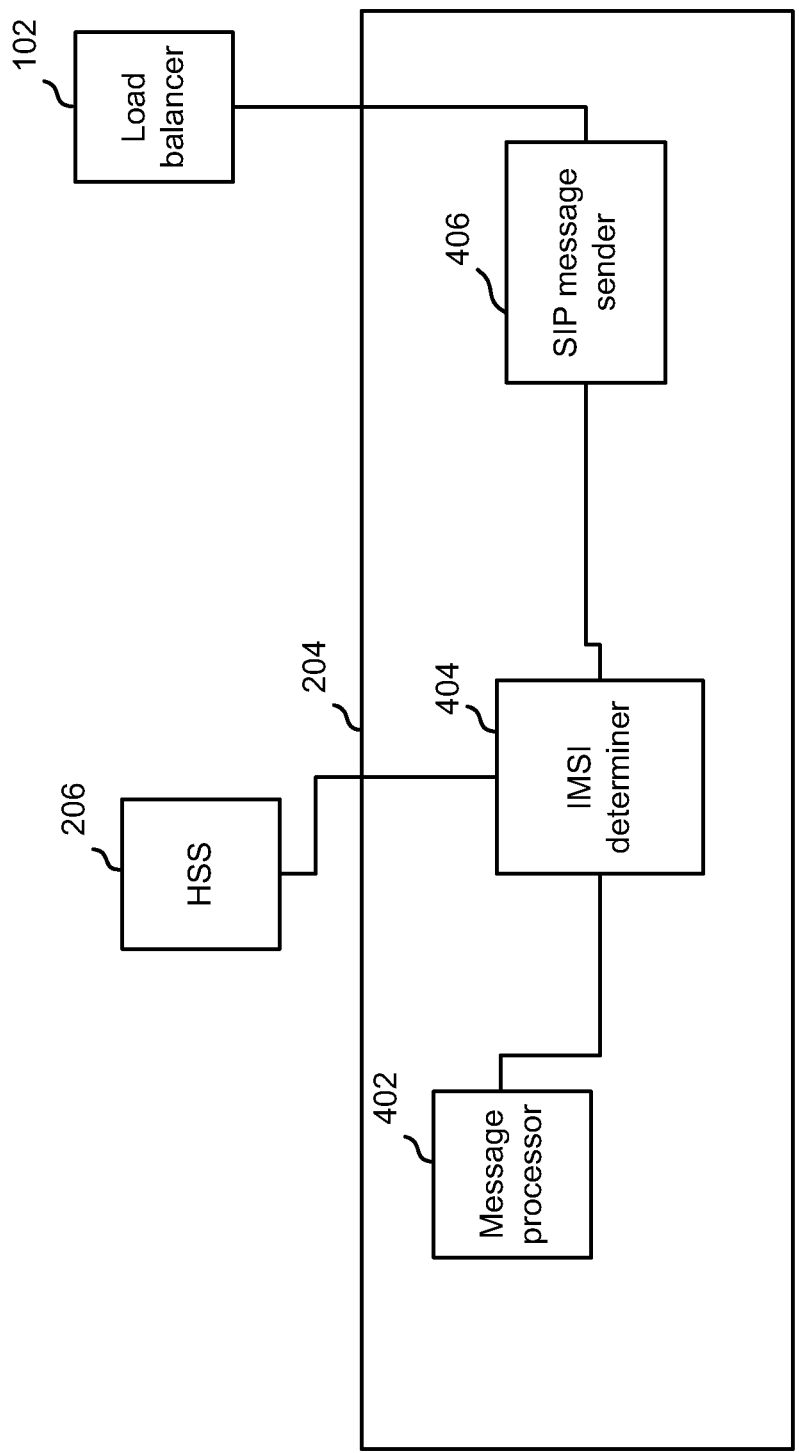
FIG. 4 depicts a more detailed example of an interworking function.

FIG. 4 depicts a more detailed example of interworking function 204. As shown, a message processor 402, an IMSI determiner 404, and a SIP message sender 406 are provided.

Message processor 402 is configured to receive messages from user device 106 in domain 108-1. In one embodiment, these messages may be SMS messages.

IMSI determiner 404 is then configured to look up an IMSI for user device 106. As mentioned above, the IMSI may be included in the message received from user device 106 or IMSI determiner 404 may communicate with HSS 206 to determine the IMSI.

Once the IMSI is determined, SIP message sender 406 is configured to interwork a message received from user device 106 into SIP. The IMSI is also included in the SIP message. SIP message sender 406 then sends the SIP message to load balancer 102.

Figure 5:
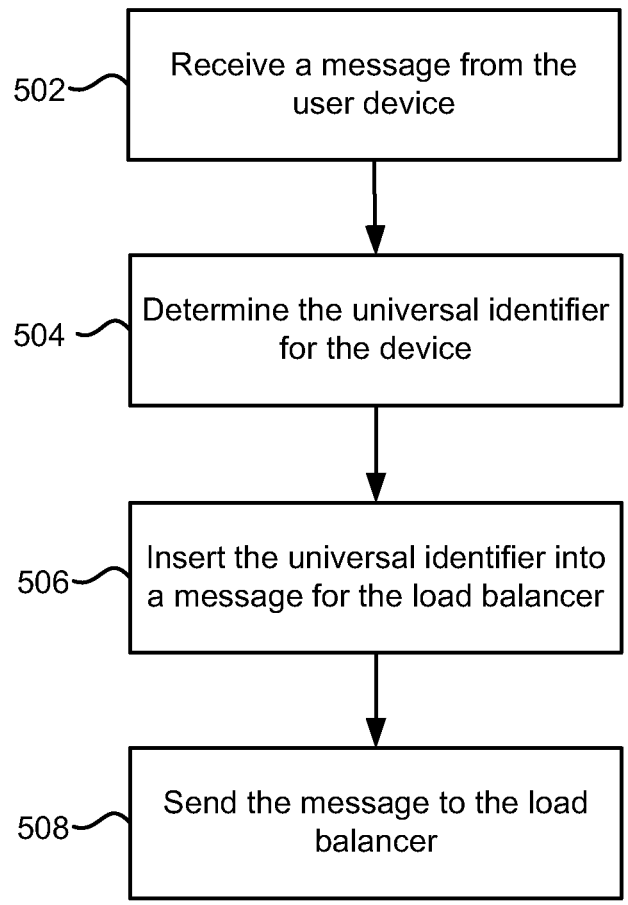
FIG. 5 depicts an example of a method for sending messages to a load balancer.

FIG. 5 depicts an example of a method for sending messages to load balancer 102 using a network device. Step 502 receives a message from user device 106. This message may be received from domain 108-1 or domain 108-2.

Step 504 determines the universal identifier for device 106. As mentioned above, the IMSI may be determined in different ways.

Step 506 inserts the universal identifier into a message for load balancer 102. For example, the IMSI may be inserted in a header for a SIP message. Step 508 then sends the message to load balancer 102. Load balancer 102 can then perform load balancing based on the universal identifier.

Figure 6:
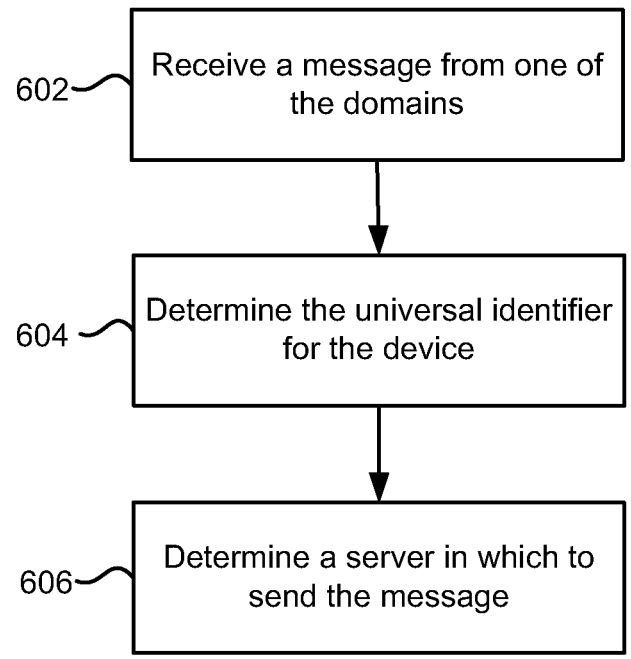
FIG. 6 depicts an example of a method for load balancing messages.

FIG. 6 depicts an example of a method for load balancing messages. In one embodiment, load balancer 102 performs the method. Step 602 receives a message from domain 108-1 or domain 108-2. For example, the message may be received from interworking function 204 or S-CSCF 212.

Step 604 then determines the universal identifier for device 106. For example, a header of the SIP message may be inspected to determine the IMSI.

Step 606 then determines a server 104 in which to send the message. For example, user device 106 may have been previously bound to the SIP application in a server 104 through a third-party registration. Load balancer 102 determines which server 104 has been bound to user device 106 and then sends the message to that server 104. Step 608 then sends a message to server 104.

Figure 7:
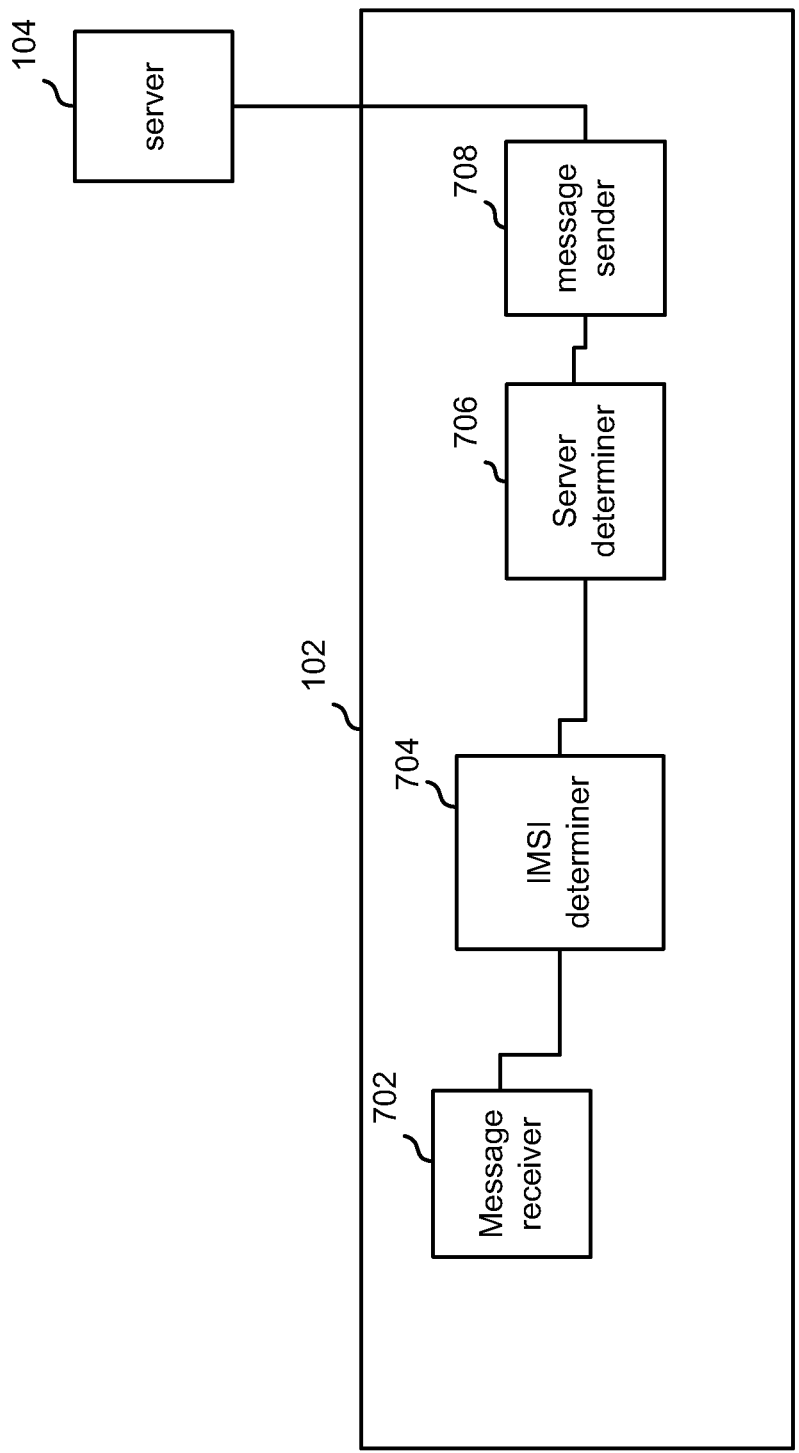
FIG. 7 depicts a more detailed example of a load balancer.

FIG. 7 depicts a more detailed example of load balancer 102. As shown, a message receiver 702, an IMSI determiner 704, a server determiner 706, and a message sender 708 are provided.

Message receiver 702 is configured to receive a message from domain 108-1 or domain 108-2. IMSI determiner 704 then determines the universal identifier for device 106. For example, a header of the SIP message may be inspected to determine the IMSI.

Server determiner 706 determines a server 104 in which to send the message. For example, server determiner 706 may use the universal identifier to determiner which server 104 has been bound to user device 106. This may be done using a table that is used to keep track of which universal identifiers are assigned to which servers 104. Message sender 708 then sends a message to server 104.

Accordingly, particular embodiments provide many advantages. For example, load balancing is provided that allows scaling of servers 104 across multiple domains 108. For example, independent scaling of Signaling System Number 7 (SS7) and IMS application server functions is provided. Views may be identified across multiple domains 108 and messages may be routed correctly to a server 104 that is processing messages for user device 106. The universal identifier is inserted using a network device in domains 108-1 and 108-2. Network devices may be leveraged to determine the universal identifier.

Although the description has been described with respect to particular embodiments thereof, these particular embodiments are merely illustrative, and not restrictive. Although SIP is described, it will be understood that other protocols may be used. Also, infrastructures other than MAP/CAP and IMS may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
    receiving, at a network device, a first domain message from a first domain, the first domain message being associated with a user device, wherein the user device is identified with a universal identifier included in the first domain message and determined by the first domain, wherein the universal identifier includes an international mobile subscriber identity (IMSI);
    assigning the first domain message to a specific server based on the universal identifier, wherein the first domain message includes a first session initiation protocol (SIP) message;
    receiving, at the network device, a second domain message from a second domain, wherein the second domain message is associated with the user device and the second domain message includes a second SIP message, wherein the second domain is separate from the first domain and the second domain communicates through a different protocol than the first domain, wherein the second domain message did not include the universal identifier when it was received by the second domain and the second domain uses an interworking function to encapsulate the second domain message and interwork the encapsulated message into a protocol used by the first domain to communicate with a home subscriber server in the first domain to determine the universal identifier; and
    assigning the second domain message to the specific server based on the universal identifier.

2. The method of claim 1, wherein the second domain message is interworked from a message in a time division multiplex (TDM) format.

3. The method of claim 1, wherein the universal identifier is included as an attribute in the first domain message.

4. The method of claim 1, wherein the universal identifier is determined by a serving call session control function in the first domain and wherein the universal identifier is sent to the home subscriber server in the first domain.

5. The method of claim 1, wherein the second domain uses the interworking function to interwork messages from the second domain into a protocol used by the first domain and a device identifier to communicate with the home subscriber server in the first domain.

6. The method of claim 1, wherein processing of the second domain message is suspended until the user device is identified with the universal identifier.

7. The method of claim 1, wherein the encapsulated messages are interworked into a SIP used by the first domain.

8. A method comprising:
receiving a first message from a user device, the first message received through a first domain, the first message including a first session initiation protocol (SIP) message, a first identifier, and a universal identifier determined by the first domain, the universal identifier being included by the first domain in a header of a session initiation protocol (SIP) message in the first message for the user device, wherein the universal identifier includes an international mobile subscriber identity (IMSI);
determining a processing device in a plurality of processing devices in which to send the first message;
sending the first message to the processing device;
receiving a second message from the user device, wherein the second message does not include the universal identifier, the second message received through a second domain, wherein the second domain is separate from the first domain and the second domain communicates through a different protocol than the first domain, the second message including a second SIP message and a second identifier different from the first identifier, wherein the second domain uses an interworking function to encapsulate the second message and interwork the encapsulated message into a protocol used by the first domain to communicate with a home subscriber server in the first domain and uses the second identifier to determine the universal identifier; and
sending the second message to the processing device for processing.

9. The method of claim 8, further comprising assigning the universal identifier to the processing device such that messages including the universal identifier received from the first domain or second domain are sent to the assigned processing device.

10. The method of claim 8, wherein a first network device inserts the universal identifier in the first message and a second network device inserts the universal identifier in the second message, the first network device and the second network device including logic to determine that the universal identifier should be inserted in the first and the second messages.

11. An apparatus comprising:
one or more computer processors; and
logic encoded in one or more tangible storage media for execution by the one or more computer processors and when executed executable to:
receive, at the apparatus, a first domain message from a first domain, wherein the first domain message includes a first session initiation protocol (SIP) message, the first domain message being associated with a user device, wherein the user device is identified with a universal identifier included in the first domain message and determined by the first domain, wherein the universal identifier includes an international mobile subscriber identity (IMSI), and wherein the apparatus is a load balancer that can associate the first domain message to a specific server in a group of servers;
receive, at the apparatus, a second domain message from a second domain, wherein the second domain message includes a second SIP message, wherein the second domain message is associated with the user device, wherein the second domain is separate from the first domain and the second domain communicates through a different protocol than the first domain, wherein the second domain message did not include the universal identifier when it was received by the second domain and the second domain used an interworking function to encapsulate the second domain message and interwork the encapsulated message into a protocol used by the first domain to communicate with a home subscriber server in the first domain to determine the universal identifier; and
assign the second domain message to the specific server based on the universal identifier.

12. The apparatus of claim 11, wherein the second domain message is interworked from a message in a time division multiplex (TDM) format.

13. The apparatus of claim 11, wherein including the universal identifier comprises including the universal identifier in a private header (P-header) of a SIP message.

14. The apparatus of claim 11, wherein determining the universal identifier comprises communicating with a node during registration of the user device.

15. The apparatus of claim 11, wherein determining the universal identifier comprises determining the universal identifier for the user device from a message received from the device.

16. An apparatus comprising:
one or more computer processors; and
logic encoded in one or more tangible storage media for execution by the one or more computer processors and is executable to:
receive a first message from a user device, wherein the first message includes a first session initiation protocol (SIP) message, the first message received through a first domain, the first message including a first identifier and a universal identifier determined by the first domain, the universal identifier being included by the first domain in a header of a session initiation protocol (SIP) message in the first message for the user device, wherein the universal identifier includes an international mobile subscriber identity (IMSI);
determine a processing device in a plurality of processing devices in which to send the message;
send the first message to the processing device;
receive a second message from the user device, wherein the second message includes a second SIP message, wherein the second message does not include the universal identifier, the second message received through a second domain, wherein the second domain is separate from the first domain and the second domain communicates through a different protocol than the first domain, the second message including a second identifier different from the first identifier, wherein the second domain uses an interworking function to encapsulate the second message and interwork the encapsulated message into a protocol used by the first domain to communicate with a home subscriber server in the first domain and uses the second identifier to determine the universal identifier;
determine the processing device in a plurality of processing devices that was determined for the first message based on the second message including the universal identifier; and
send the second message to the processing device for processing.

17. The apparatus of claim 16, wherein the logic when executed is further executable to assign the universal identifier to the processing device such that messages including the universal identifier received from the first domain or second domain are sent to the assigned processing device.

18. A system comprising: a first network device in a first domain, the first network device configured to receive a first message from a user device, wherein the first message includes a first session initiation protocol (SIP) message, wherein the first network device determines a universal identifier associated with the user device, wherein the universal identifier includes an international mobile subscriber identity (IMSI), wherein the first network device is configured to insert the universal identifier in a header of the first session initiation protocol (SIP) message;

a second network device in a second domain, wherein the second domain is separate from the first domain and the second domain communicates through a different protocol than the first domain, the second network device configured to receive a second message from the user device that does not include the universal identifier, wherein the second message includes a second SIP message, wherein the second network device uses an interworking function to encapsulate the second message and interwork the encapsulated message into a protocol used by the first domain to communicate with a home subscriber server in the first domain to determine the universal identifier associated with the user device, wherein the second network device is configured to insert the universal identifier in the second message, wherein the first domain is different from the second domain; and a load balancer configured to receive the first message and the second message and to send the first and second messages to a processing device based on the first and second messages including the universal identifier.

19. The system of claim 18, further comprising a server configured to store information associating the universal identifier with the user device, wherein the first network device or the second network device communicates with the server to determine the universal identifier to insert.

\* \* \* \* \*